(12) United States Patent
Maruyama

(10) Patent No.: US 9,083,928 B2
(45) Date of Patent: Jul. 14, 2015

(54) IMAGING APPARATUS FOR IMPROVING SENSITIVITY TO IMPROVE IMAGE QUALITY UNDER LOW LUMINANCE

(75) Inventor: Naoki Maruyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 13/171,330

(22) Filed: Jun. 28, 2011

(65) Prior Publication Data

US 2012/0013765 A1  Jan. 19, 2012

(30) Foreign Application Priority Data

Jul. 15, 2010  (JP) ................................. 2010-160613

(51) Int. Cl.
*H04N 9/73* (2006.01)
*G03B 17/14* (2006.01)
*H04N 5/243* (2006.01)

(52) U.S. Cl.
CPC ................ *H04N 9/735* (2013.01); *G03B 17/14* (2013.01); *H04N 5/243* (2013.01)

(58) Field of Classification Search
CPC ......... H04N 9/735; H04N 5/243; G03B 17/14
USPC .......... 348/164, 207.99, 222.1, 223.1–225.1, 348/229.1, 230.1, 234, 360–362, 216.1
See application file for complete search history.

(56) References Cited

U.S. PATENT DOCUMENTS

| 5,194,944 A | * | 3/1993 | Uchiyama et al. ......... 348/223.1 |
| 5,448,294 A | * | 9/1995 | Yamazaki ................. 348/230.1 |
| 2005/0088537 A1 | * | 4/2005 | Nakamura et al. ......... 348/223.1 |
| 2006/0098103 A1 | * | 5/2006 | Park ........................... 348/222.1 |
| 2007/0023497 A1 | * | 2/2007 | Chuang et al. ................ 235/375 |
| 2007/0257995 A1 | * | 11/2007 | Horowitz et al. ............. 348/234 |
| 2011/0193967 A1 | * | 8/2011 | Matsumoto et al. .......... 348/164 |

FOREIGN PATENT DOCUMENTS

JP   2009-159017 A   7/2009

\* cited by examiner

*Primary Examiner* — Dennis Hogue
(74) *Attorney, Agent, or Firm* — Canon U.S.A., Inc. IP Division

(57) ABSTRACT

An imaging apparatus includes an imaging unit, a white balance adjustment unit configured to adjust a white balance of image data output from the imaging unit, a determination unit configured to determine brightness of the image data, a filter control unit configured to control a filter in order not to cause light including a predetermined wavelength component incident on the imaging unit, and a control unit configured to, if the determination unit determines that the image data is darker than a predetermined value, execute both of a first mode for amplifying a gain of each color of the image data by the white balance adjustment unit and a second mode for controlling the filter by the filter control unit so as to cause the light including the predetermined wavelength component incident on the imaging unit.

6 Claims, 13 Drawing Sheets

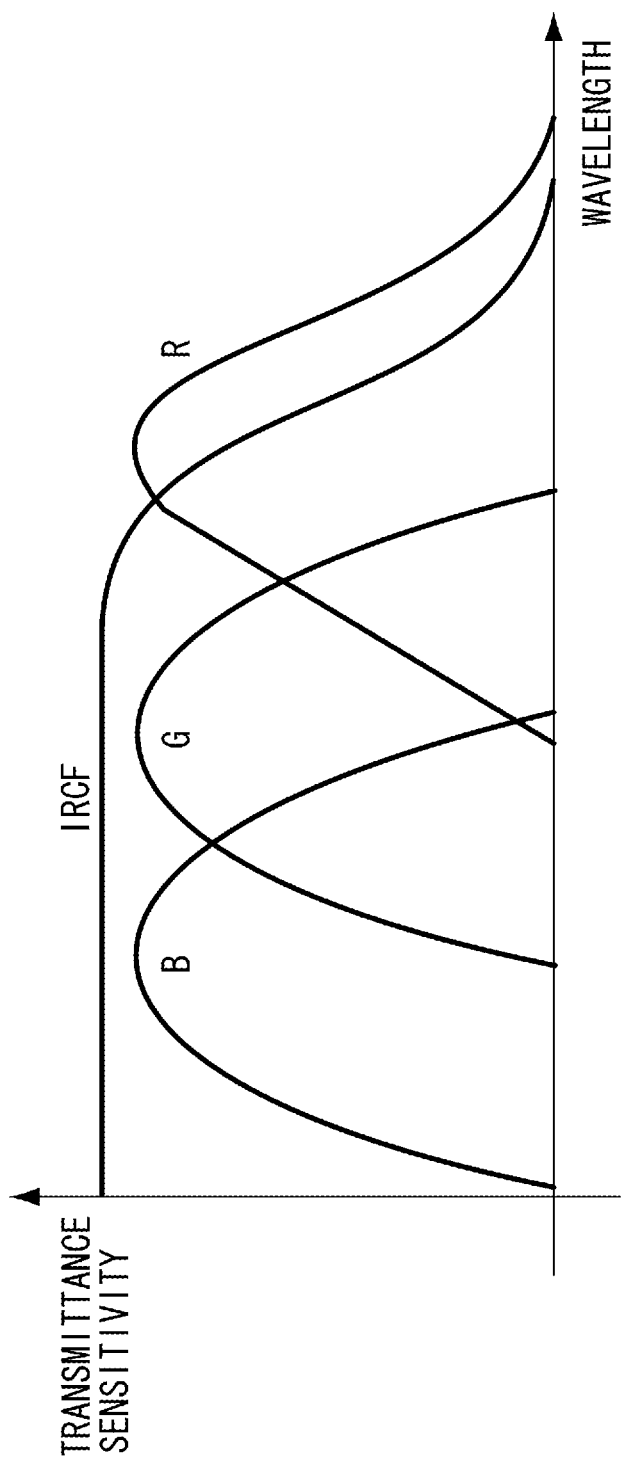

IMAGING APPARATUS FOR IMPROVING SENSITIVITY TO IMPROVE IMAGE QUALITY UNDER LOW LUMINANCE

BACKGROUND OF THE INVENTION

1. Field of the Invention

The present invention relates to a technique to improve sensitivity of an imaging apparatus.

2. Description of the Related Art

Conventionally, regarding a video signal of an imaging apparatus, light passing through a lens is formed as an image on an image sensor via an infrared ray cut filter (hereinafter, referred to as IRCF). The IRCF prevents the infrared rays, which is invisible to the human eyes, from entering the image sensor and prevents a video from becoming reddish by the infrared rays. Then, the imaging apparatus converts the light whose infrared rays are cut into a video signal by the image sensor, executes white balance (hereinafter, referred to as WB) adjustment from the video signal to balances red, green and blue (RGB) components, and outputs the adjusted signal as a color image.

In addition, the imaging apparatus extracts the IRCF located in the previous stage of the image sensor from the optical path and causes the image sensor to receive the infrared rays cut by the IRCF to improve sensitivity. However, extraction of the IRCF may disturb the RGB balance of the video signal, and thus, it becomes difficult to achieve the WB. Accordingly, the imaging apparatus uses a technique for changing from output of a color image to output of a monochrome image when the IRCF is extracted. Such the technique enables the imaging apparatus to capture an image which is the monochrome image but has improved sensitivity. Further, by such the technique, the imaging apparatus can increase the luminance of the image and perform shooting of a low-illuminance object with excellent visibility.

Conventionally, various techniques for improving the sensitivity have been considered. As a technique to brighten a darkened image regardless of insertion and extraction of the IRCF, the following technique is known. In a technique discussed in Japanese Patent Application Laid-Open No. 2009-159017, a luminance value of an image before and after the WB adjustment is memorized, and the difference therebetween is added to the image after WB adjustment to solve a reduction in luminance due to the WB adjustment.

However, the technique discussed in Japanese Patent Application Laid-Open No. 2009-159017 only corrects the reduction in luminance caused by executing the WB adjustment and cannot improve the sensitivity more than that. Further, the conventional method for improving sensitivity by the insertion and extraction operation of the IRCF requires time to move the optical filter accompanied by the insertion and extraction operation, and is inferior in responsiveness when a mode is shifted to the one of improving sensitivity. Furthermore, since a holding frame of the IRCF intersects the image sensor when the IRCF is inserted and extracted, an image is hard to see when the IRCF is inserted and extracted.

SUMMARY OF THE INVENTION

The present invention is directed to a technique capable of increasing sensitivity further than a conventional method for improving sensitivity and of obtaining an excellent image under low illuminance.

Further, the present invention can improve responsiveness when sensitivity is increased and reduce an unwelcome interruption to a scene without causing a holding frame to cut across the scene as possible.

According to an aspect of the present invention, an imaging apparatus includes an imaging unit, a white balance adjustment unit configured to adjust a white balance of image data output from the imaging unit, a determination unit configured to determine brightness of the image data, a filter control unit configured to control a filter in order not to cause light including a predetermined wavelength component incident on the imaging unit, and a control unit configured to, if the determination unit determines that the image data is darker than a predetermined value, execute both of a first mode for amplifying a gain of each color of the image data by the white balance adjustment unit and a second mode for controlling the filter by the filter control unit so as to cause the light including the predetermined wavelength component incident on the imaging unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a relationship between sensitivity of an image sensor, transmittance of an IRCF, and a wavelength.

DESCRIPTION OF THE EMBODIMENTS

Various exemplary embodiments, features, and aspects of the invention will be described in detail below with reference to the drawings.

Figure 1:
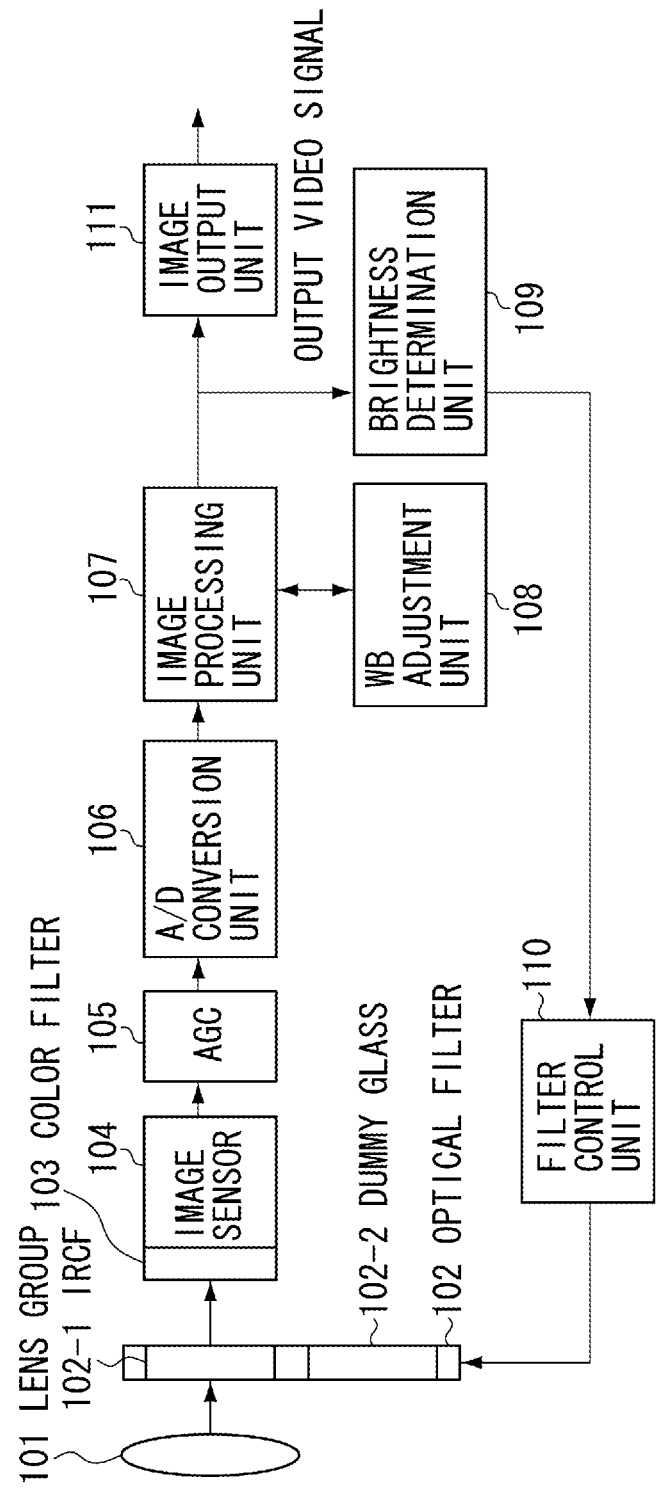
FIG. 1 illustrates a configuration of an imaging apparatus according to an exemplary embodiment of the present invention.

FIG. 1 illustrates a configuration of an imaging apparatus according to a first exemplary embodiment of the present invention. In FIG. 1, a lens group 101 is an optical system to concentrate light incident from an object on an image sensor 104. The light incident in the imaging apparatus passes through an optical filter 102 via the lens group 101, passes through a color filter 103 arranged in a predetermined order for each pixel of a light receiving surface of the image sensor 104, and is received by the image sensor 104.

On the optical filter 102, an IRCF 102-1 and a dummy glass 102-2 are disposed. The IRCF 102-1 removes light with a wavelength component in an infrared region (i.e., infrared rays) from the incident light to prevent the infrared rays from entering the image sensor 104. Accordingly, the infrared ray, which is invisible to the human eyes, is prevented from entering the image sensor 104 so as not to cause an image to be reddish.

FIG. 2 illustrates a relationship between sensitivity of the image sensor 104, transmittance of the IRCF 102-1, and a wavelength. When the color filter 103, which allows light to pass through, is a color filter for a primary color for example, each light component of RGB is received the image sensor 104. The respective light components are received by sensitivity illustrated in FIG. 2. At that time, the respective light components are received according to the transmittance of the IRCF 102-1 illustrated in FIG. 2. In the IRCF 102-1, the transmittance becomes inferior on the long wavelength side with respect to the red light including a long wavelength component among the respective light components. This indicates that the sensitivity is decreased to the red component. Thus, a wavelength referred to as an infrared region, which is invisible to the human eyes, is cut, so that an image can be prevented from being reddish.

On the other hand, the dummy glass 102-2 has a role in suppressing a change in an optical path length when the IRCF 102-1 is extracted from the optical path. The IRCF 102-1 is extracted from the optical path in the case of low illuminance to cause the image sensor 104 to receive the infrared rays, so that the change in the optical path length due to extraction of the IRCF 102-1 when sensitivity is improved is corrected. The image sensor 104 outputs an image signal of an object image as an analog signal. An analog-to-digital (A/D) conversion unit 106 converts the analog signal output from the image sensor 104 into a digital signal.

An image processing unit 107 executes predetermined processing to the image data of the digital signal output from the A/D conversion unit 106 to output a luminance signal and a color signal for each pixel. Further, the image processing unit 107 generates the image data for output and also creates parameters to be used for controlling the imaging apparatus.

The parameters includes the one which is used in diaphragm control, focus control, or the like. In addition to this, the present exemplary embodiment uses a parameter to execute white balance (hereinafter, referred to as WB) adjustment, and a parameter to determine brightness of the image data to execute insertion and extraction of the IRCF 102-1 according to the brightness.

A brightness determination unit 109 calculates luminance information in a shooting screen using at least one of the parameters, such as automatic gain control (AGC), a shutter speed, a diaphragm, luminance, illuminance, and color information, which are obtained from the image processing unit 107 to determine brightness and darkness of the image data. In the brightness determination unit 109, when it is determined that the image data is dark, the dummy glass 102-2 is inserted into the optical path by a filter control unit 110.

On the other hand, in the brightness determination unit 109, when it is determined that the image data is bright, the IRCF 102-1 is inserted into the optical path by the filter control unit 110. The image processing unit 107 changes a mode to display an image between a color display mode and a monochrome display mode according to whether the IRCF 102-1 is inserted or not. Thus, the image data generated by the image processing unit 107 is output from an image output unit 111 in expression corresponding to the mode.

In the following description, a state in which color expression is performed since the IRCF 102-1 is inserted on the optical path and color expression is prepared is referred to as a day mode. Further, a state in which monochrome expression is performed since the IRCF 102-1 is extracted from the optical path and the dummy glass 102-2 is inserted thereinto, and sensitivity is high but color expression cannot appropriately be performed is referred to as a night mode.

A feature in the present exemplary embodiment is not only to insert and extract the IRCF 102-1 to improve the sensitivity but also to increase a gain of each color of RGB for WB adjustment with ignoring the WB. Accordingly, an effect of the improvement of sensitivity more than that is provided only by insertion and extraction of the IRCF 102-1 can be obtained.

Figure 3A:
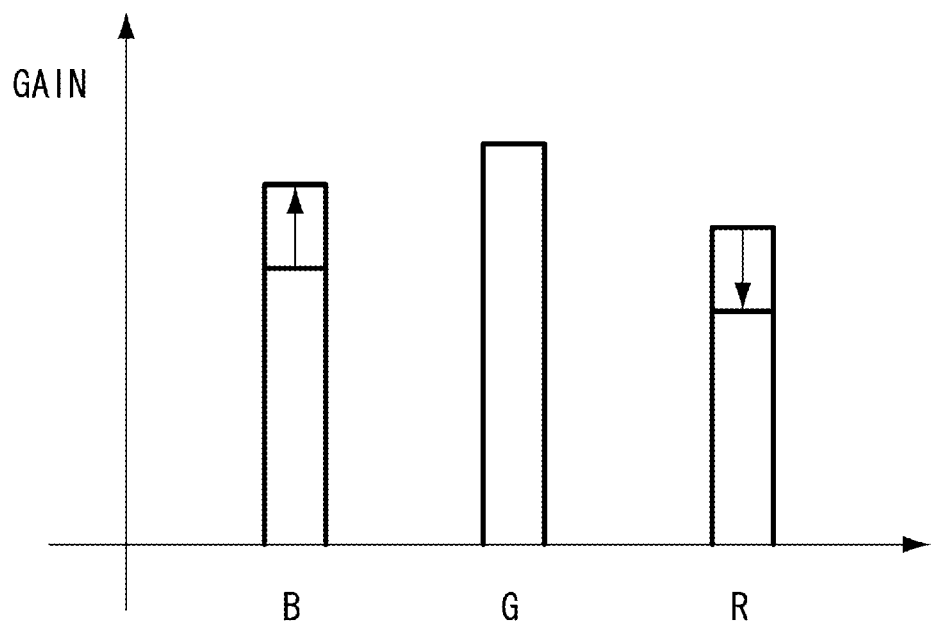
FIGS. 3A and 3B illustrate gain control of each color of RGB.
Figure 3B:
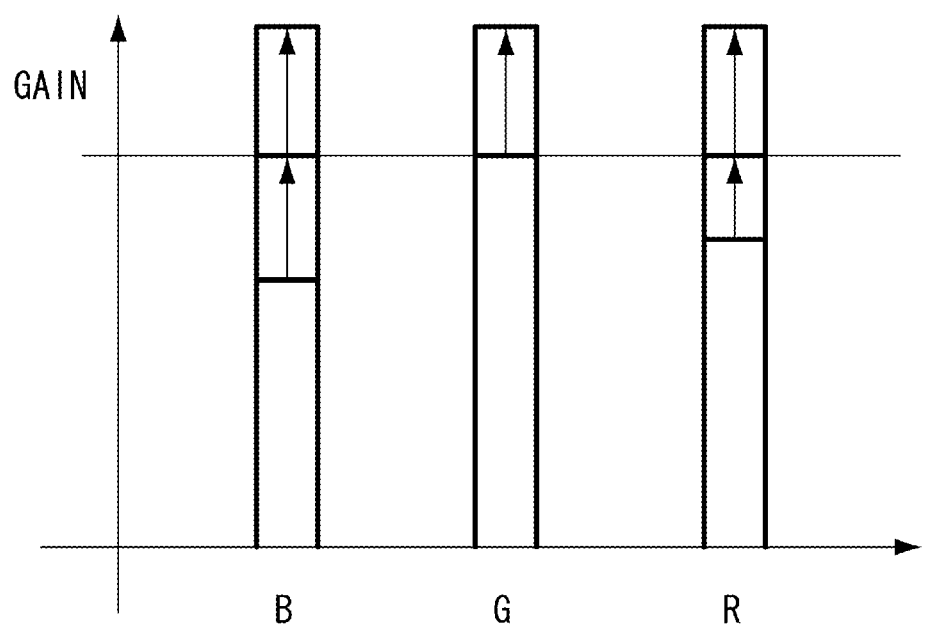

FIGS. 3A and 3B illustrate gain control of each color of RGB. FIG. 3A illustrates general WB adjustment. In an example illustrated in FIG. 3A, a G gain is fixed and the WB adjustment is executed by adjusting two gains of an R gain and a B gain. Conventionally, as illustrated in FIG. 3A, the WB adjustment is executed by adjusting gains of the respective colors of RGB. On the contrary, a white balance adjustment unit (WB adjustment unit) 108 according to the present exemplary embodiment is used not only for the WB adjustment of the gains of respective colors of RGB but also for improvement of the sensitivity.

FIG. 3B illustrates a function of the WB adjustment unit 108 in the present exemplary embodiment. More specifically, as illustrated in FIG. 3B, the WB adjustment unit 108 amplifies each value of a B gain, a G gain, and an R gain corresponding to brightness of the image data, so that luminance is increased. As a result, the image data without achieving WB is obtained. However, this processing is executed in the state that the monochrome expression performed in the night mode, and a tint of the image can be prevented from becoming strange. Thus, the IRCF 102-1 is extracted from the optical path and the gain of each color of RGB is increased, so that the sensitivity can be improved further than the conventional technique.

For the convenience of description, in the following, a mode for extracting the IRCF 102-1 from the optical path to improve the sensitivity is referred to as an analog night mode (AN) as a distinction of the night mode. Further, a mode for increasing the gain of each color of RGB to improve the sensitivity is referred to as a digital night mode (DN).

In the present exemplary embodiment, when the image data becomes dark, in order to increase the sensitivity, both of the DN and AN are executed (DN+AN). Further, when the image data becomes bright, the mode is returned from the state of DN+AN to the day mode.

Figure 4A:
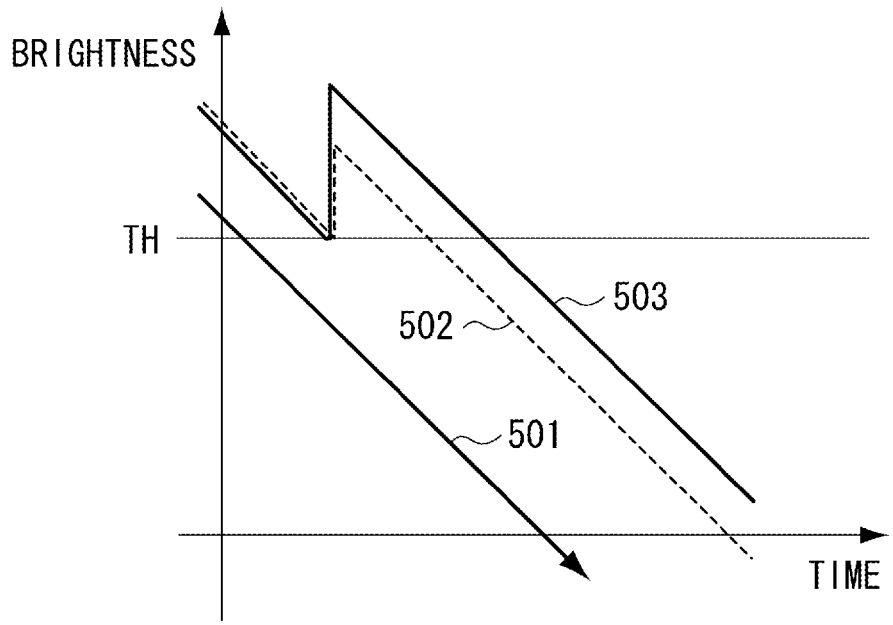
FIGS. 4A and 4B illustrate processing executed when a day mode is changed to a night mode according to a first exemplary embodiment of the present invention.
Figure 4B:
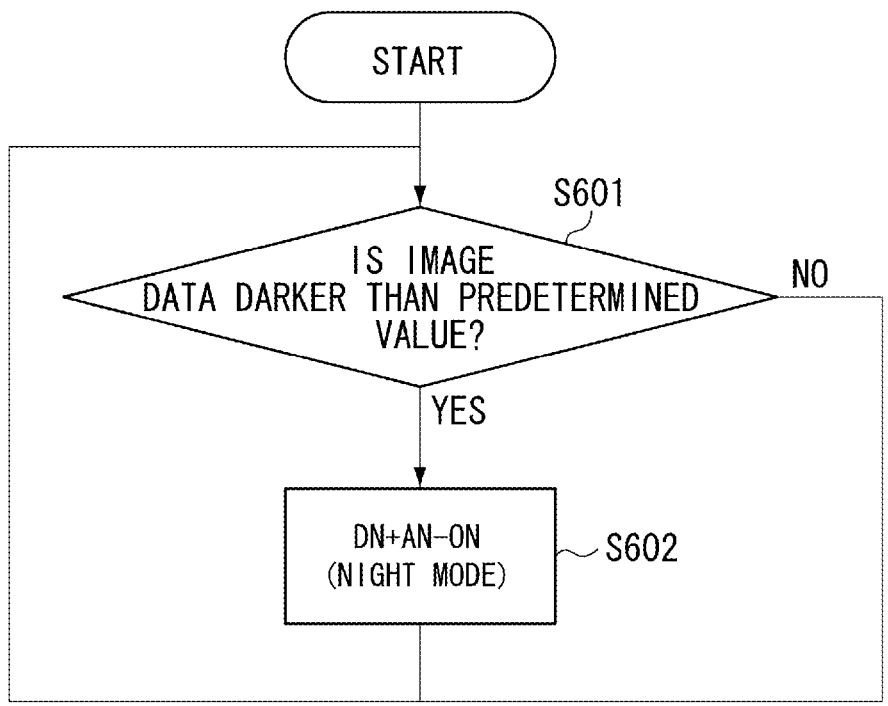

FIGS. 4A and 4B illustrate processing executed when the day mode is changed to the night mode according to the present exemplary embodiment. In an environment where the image data is darkened over time as illustrated by an arrow

501 in FIG. 4A, the imaging apparatus of the conventional technique improves the sensitivity by extracting the IRCF 102-1 from the optical path when the image data becomes predetermined darkness (TH) as illustrated by a dotted line 502 in FIG. 4A.

On the contrary, in the present exemplary embodiment, as illustrated by a solid line 503 in FIG. 4A, when the image data becomes the predetermined darkness (TH), the imaging apparatus uses both of DN and AN to improve the sensitivity (DN+AN). Accordingly, compared with the conventional technique for improving the sensitivity only by extracting the IRCF 102-1 from the optical path, the present exemplary embodiment can further improve the sensitivity since both of the DN and AN are executed.

FIG. 4B is a flowchart illustrating the processing executed when the day mode is changed to the night mode in the present exemplary embodiment. The processing executed when the day mode is changed to the night mode in the present exemplary embodiment will be described below referring to FIG. 4B.

First, in step 601, the brightness determination unit 109 determines whether the image data is darker than a predetermined value. If the image data is darker than the predetermined value (YES in step S601), in step S602, the WB adjustment unit 108 and the filter control unit 110 use both of the DN and AN to improve the sensitivity.

In the present exemplary embodiment, when the mode is changed and sufficient brightness is obtained, processing for maintaining proper exposure is executed and hence luminance is kept at constant. For simplifying the description, the processing for maintaining the exposure is not illustrated and described. However, the processing is included as the configuration in the present exemplary embodiment. Also in the following description, illustration and description for this portion will be omitted.

Figure 5A:
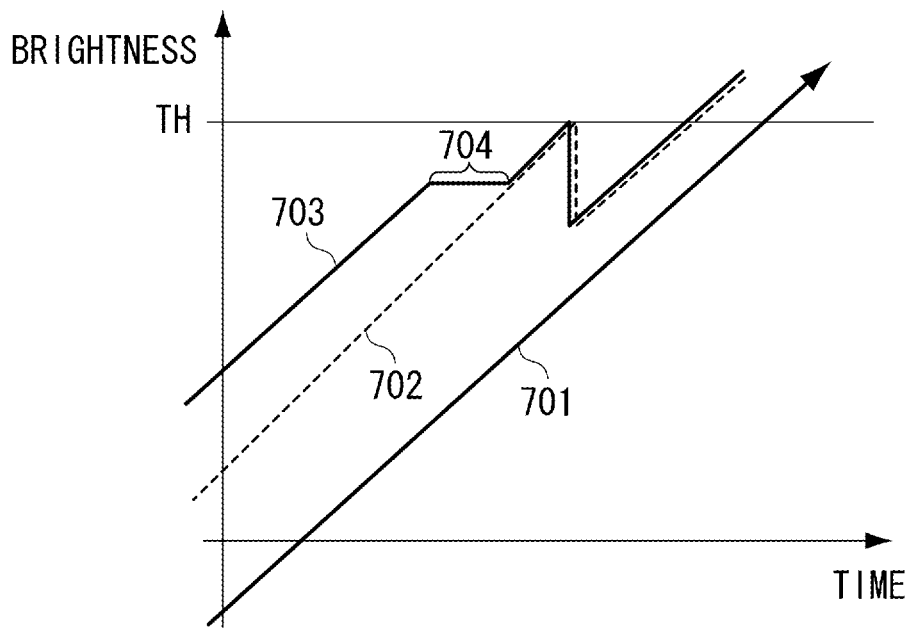
FIGS. 5A and 5B illustrate processing executed when the night mode is changed to the day mode according to the first exemplary embodiment of the present invention.
Figure 5B:
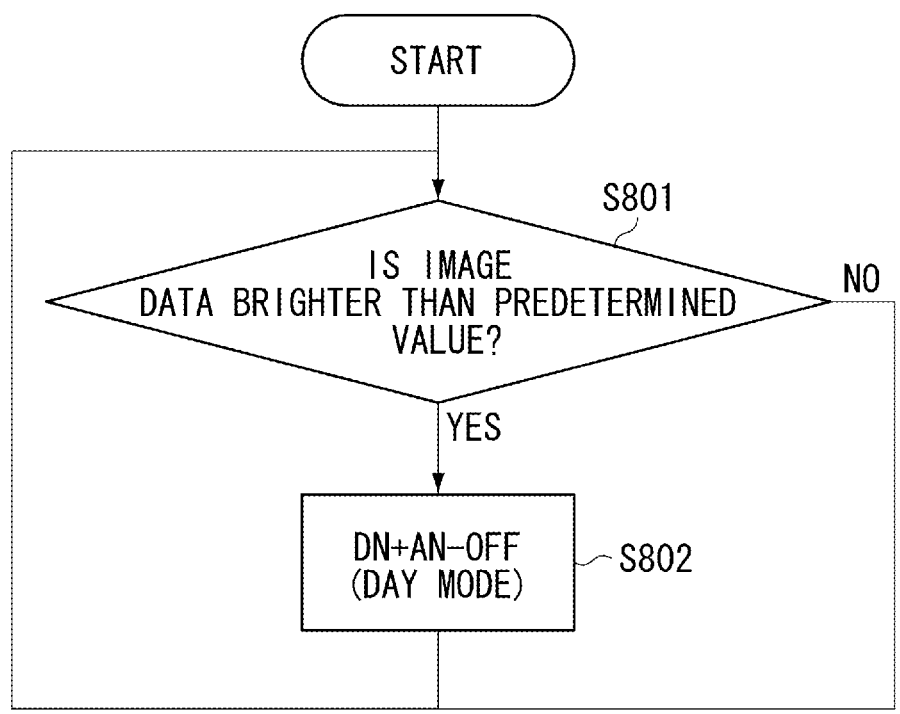

FIGS. 5A and 5B illustrate processing executed when the night mode is changed to the day mode according to the present exemplary embodiment. In an environment where the image data is brightened over time as illustrated by an arrow 701 in FIG. 5A, the imaging apparatus of the conventional technique inserts the IRCF 102-1 on the optical path when the image data becomes predetermined brightness (TH) as illustrated by a dotted line 702 in FIG. 5A, and changes the night mode to the day mode.

On the contrary, in the present exemplary embodiment, as illustrated by a solid line 703 in FIG. 5A, when the image data becomes the predetermined brightness (TH), the imaging apparatus turns off the state of DN+AN to change to the day mode. Thus, the imaging apparatus according to the present exemplary embodiment can output the image data with brightness similar to that of the conventional technique. In the present exemplary embodiment, when the brightness of the image data becomes a sufficient value in the middle of that reaches the predetermined brightness (TH), as illustrated by a range 704 in FIG. 5A, processing for maintaining the proper exposure is executed while adjusting the gain of the DN in the night mode.

FIG. 5B is a flowchart illustrating the processing executed when the night mode is changed to the day mode in the present exemplary embodiment. The processing executed when the night mode is changed to the day mode in the present exemplary embodiment will be described below referring to FIG. 5B.

First, in step 801, the brightness determination unit 109 determines whether the image data is brighter than a predetermined value. If the image data is brighter than the predetermined value (YES in step S801), in step S802, the WB adjustment unit 108 and the filter control unit 110 stop processing of both of the DN and AN to change to the day mode.

Figure 6A:
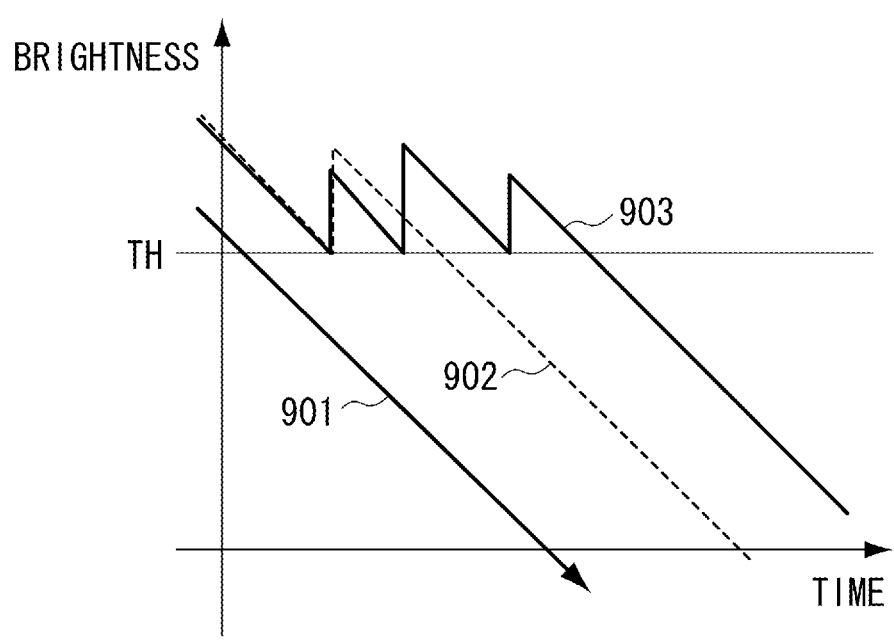
FIGS. 6A and 6B illustrate processing executed when a day mode is changed to a night mode according to a second exemplary embodiment of the present invention.
Figure 6B:
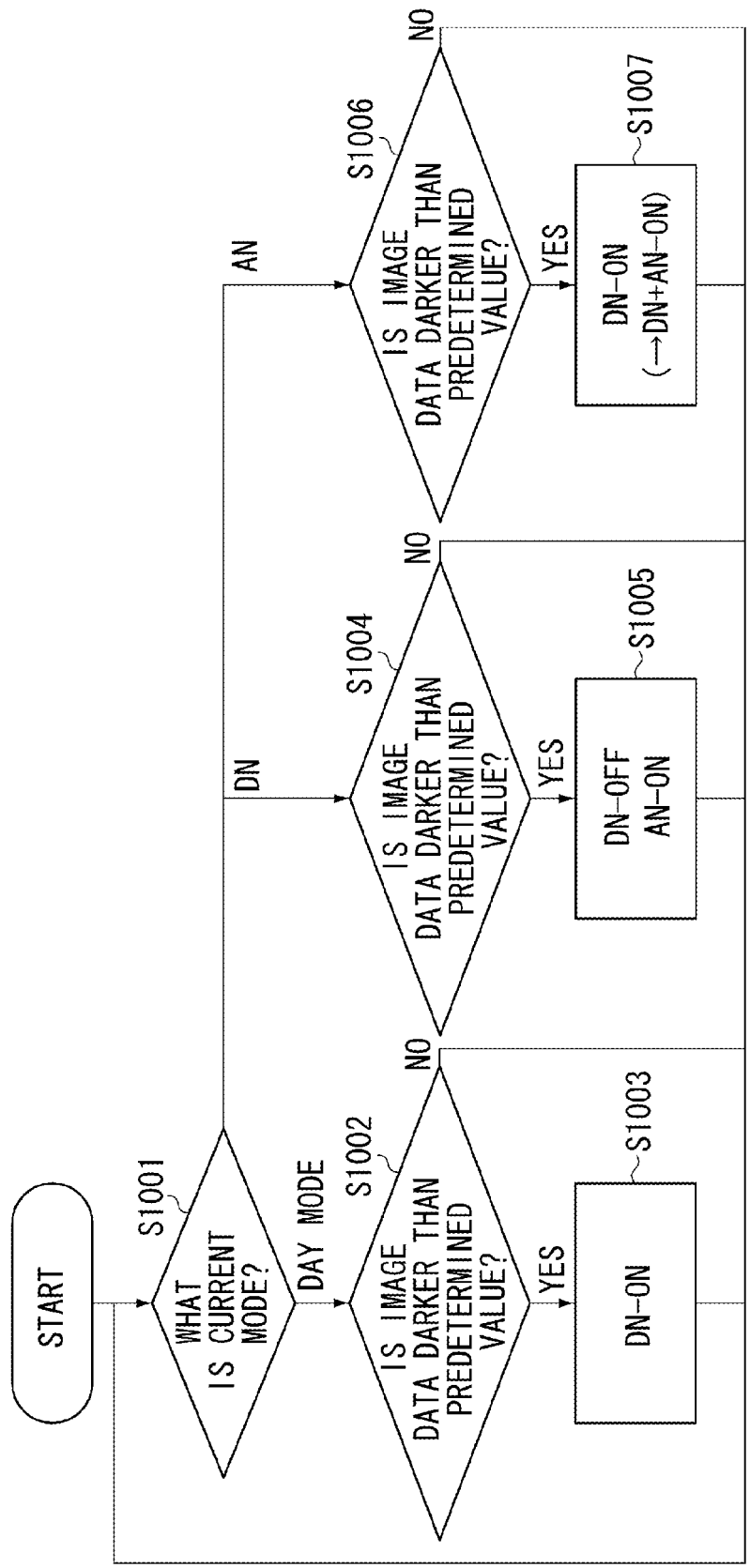

Next, a second exemplary embodiment of the present invention will be described. FIGS. 6A and 6B illustrate processing executed when the day mode is changed to the night mode according to the present exemplary embodiment.

In an environment where the image data is darkened over time as illustrated by an arrow 901 in FIG. 6A, the imaging apparatus of the conventional technique improves the sensitivity by extracting the IRCF 102-1 from the optical path when the image data becomes predetermined darkness (TH) as illustrated by a dotted line 902 in FIG. 6A. On the contrary, in the present exemplary embodiment, as illustrated by a solid line 903 in FIG. 6A, when the image data becomes darker than the predetermined value (TH), the imaging apparatus improves the sensitivity in a stepwise manner.

FIG. 6B is a flowchart illustrating the processing executed when the day mode is changed to the night mode in the present exemplary embodiment. The processing executed when the day mode is changed to the night mode in the present exemplary embodiment will be described below referring to FIG. 6B. The configuration of the imaging apparatus according to the present exemplary embodiment is similar to the configuration of the imaging apparatus according to the first exemplary embodiment illustrated in FIG. 1.

First, in step 1001, the imaging apparatus determines a current mode. The determination of the mode in FIG. 6B is a determination of whether the current mode is the day mode or the night mode. When the current mode is determined as the night mode, the determination further includes whether the night mode is the DN, the AN, or the AN+DN.

In the environment where the image data is darkened over time as illustrated by the arrow 901 in FIG. 6A, if the current mode is the day mode (DAY MODE in step S1001), then in step S1002, the brightness determination unit 109 determines whether the image data is darker than the predetermined value.

If the image data is darker than the predetermined value (YES in step S1002), in step S1003, the WB control unit 108 turns the DN on to improve the sensitivity. At this time, the image processing unit 107 changes the mode to display an image to the monochrome display mode. Accordingly, as compared with the conventional technique for improving the sensitivity with the AN, the present exemplary embodiment can reduce an obstruction to see an image due to a movement of the holding frame accompanied by insertion and extraction of the IRCF 102-1 and also improve the responsiveness of mode change transition time accompanied by insertion and extraction of the IRCF 102-1.

In step S1001, the imaging apparatus determines the current mode after turning on the DN. Since the current mode is the DN, the processing proceeds to step S1004. In step S1004, the brightness determination unit 109 determines whether the image data is darker than the predetermined value.

Further, when time elapses and the image data becomes darker than the predetermined value (YES in step S1004), in step S1005, the WB control unit 108 turns the DN off, and also the filter control unit 110 turns the AN on. Accordingly, the sensitivity can be improved since infrared rays are received by the image sensor 104. At this time, the image processing unit 107 changes the mode to display an image to the color display mode.

In step S1001, the imaging apparatus determines the current mode after turning on the AN. Since the current mode is the AN, the processing proceeds to step S1006. In step S1006, the brightness determination unit 109 determines whether the image data is darker than the predetermined value.

Further, if time elapses and the image data becomes darker than the predetermined value (YES in step S1006), in step S1007, the WB adjustment unit 108 turns the DN on. As a result, the mode shifts to the DN+AN. Accordingly, the sensitivity can be improved using both of the DN+AN. Thus, as compared with the conventional technique for improving the sensitivity only with the AN, for example, the present exemplary embodiment can realize an imaging apparatus having high performance in low-illuminance.

In steps S1002, S1004, and S1006, if it is determined that the image data is not darker than the predetermined value, the mode is not changed and the processing returns to the mode determination processing in step S1001. Further, since the processing to change the mode from the night mode to the day mode is similar to the processing described in the first exemplary embodiment, the description thereof will be omitted here.

As described above, the present exemplary embodiment can reduce the unwelcome interruption to the image due to insertion and extraction of the IRCF 102-1 and improve the sensitivity with good responsiveness. Further, the sensitivity can be improved using both of the DN+AN. Thus, as compared with the conventional technique for improving the sensitivity only with the AN, for example, the present exemplary embodiment can realize an imaging apparatus having high performance in low-illuminance.

Figure 7:
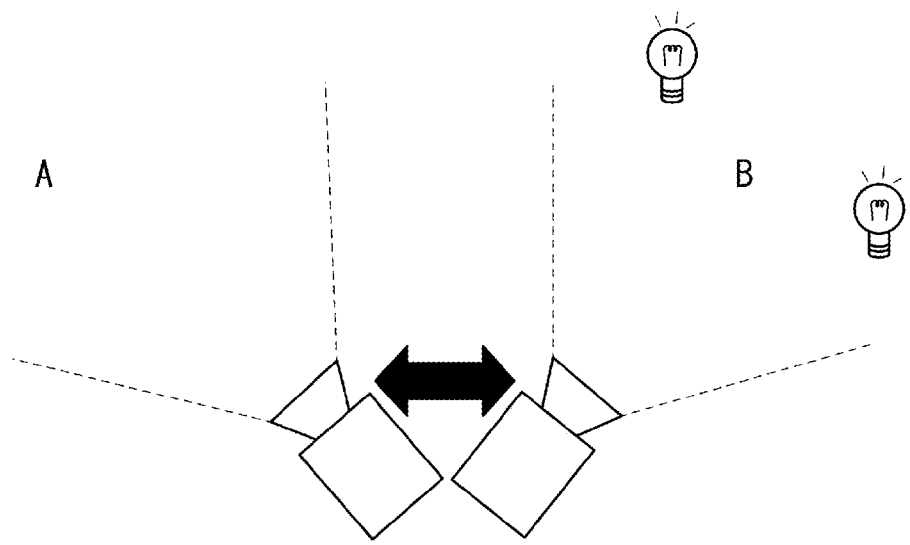
FIG. 7 illustrates an example of an installation environment of an imaging apparatus according to a third exemplary embodiment of the present invention.

Next, a third exemplary embodiment of the present invention will be described. FIG. 7 illustrates an example of an installation environment of an imaging apparatus according to the present exemplary embodiment. FIG. 7 schematically illustrates a state in which the imaging apparatus performs shooting while traveling preset shooting positions (direction) alternately between an area A and an area B. The area A has no illumination and becomes dark with time, and the area B has illumination and is always kept at the constant brightness regardless of time.

In such the environment, a preset traveling camera serving as the imaging apparatus according to the present exemplary embodiment mutually travels the area A and the area B. Thus, there is an issue that if traveling time is short to a certain extent, when the camera travels from the area B to the area A and from the area A to the area B, sensitivity switching processing suitable for the situation cannot be applied. In the switching of sensitivity, generally, it is required to determine whether the switching needs to be performed and time is consumed to the processing. Accordingly, in the present exemplary embodiment, in order to respond to such the issue, brightness in the previous preset position is stored to execute a suitable sensitivity switching mode corresponding to the brightness at that time.

Figure 8A:
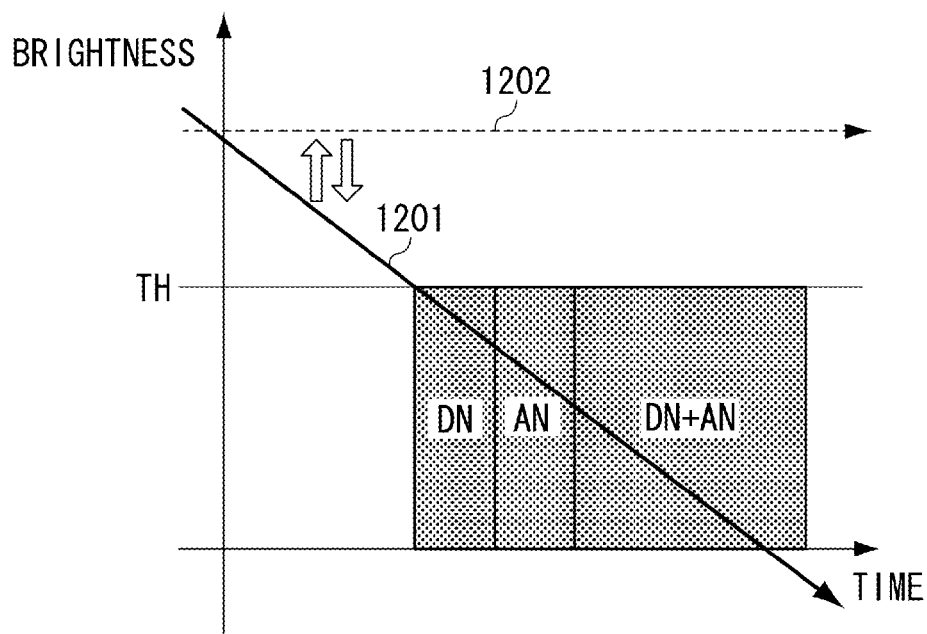
FIGS. 8A and 8B illustrate processing executed when a day mode is changed to a night mode according to the third exemplary embodiment of the present invention.
Figure 8B:
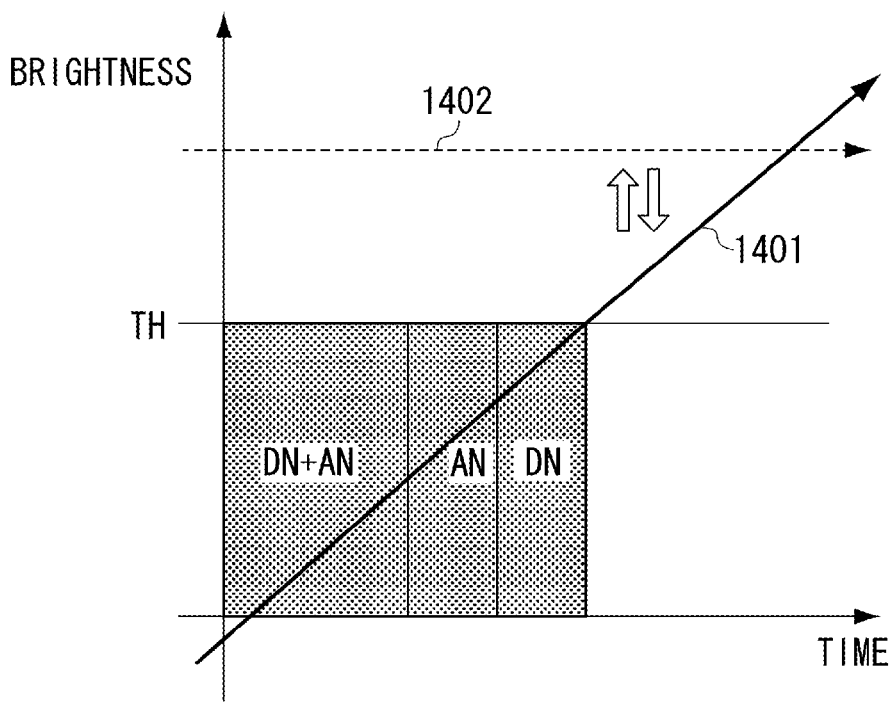

FIGS. 8A and 8B illustrate processing executed when the day mode is changed to the night mode according to the present exemplary embodiment. First, the preset traveling camera outputs a color image at the day mode both in the area A and the area B. Then, when the area A gradually becomes dark with time as illustrated by an arrow 1201 in FIG. 8A and the area B is maintained at the constant brightness regardless of the passage of time as illustrated by an arrow 1202, a difference in brightness appears between the area A and the area B.

In the area A, there are three regions of the DN, the AN, and the DN+AN for each brightness. When the area A has brightness corresponding to each region, the traveling camera improves the sensitivity with the optimum mode in advance, instead of changing a mode for improving the sensitivity in a stepwise manner. Accordingly, the optimum luminance control can be executed with good responsiveness.

Figure 9:
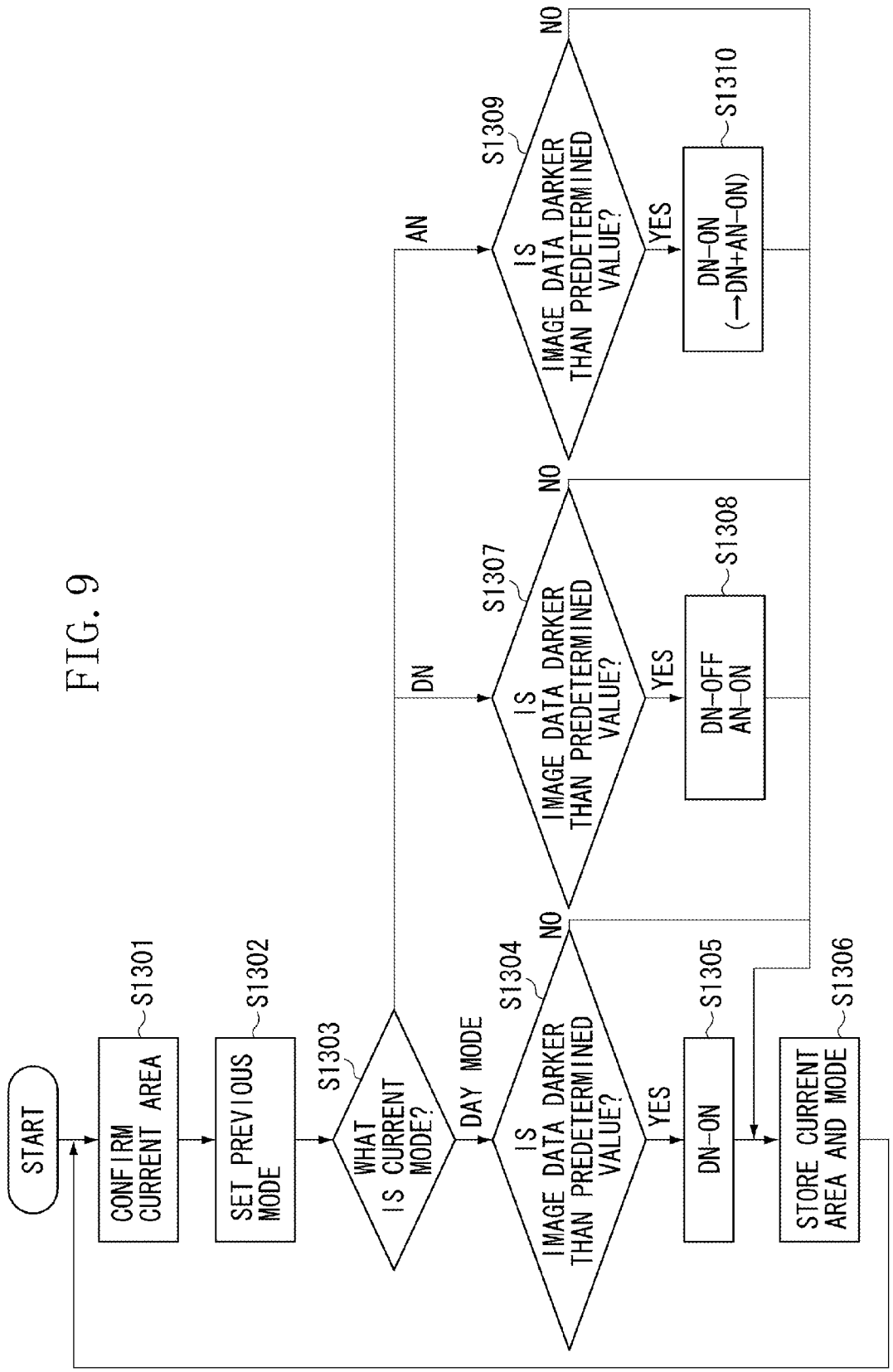
FIG. 9 is a flowchart illustrating processing of a preset traveling camera serving as an imaging apparatus according to a third exemplary embodiment of the present invention.

FIG. 9 is a flowchart illustrating processing of the preset traveling camera serving as the imaging apparatus according to the present exemplary embodiment. The processing of the imaging apparatus according to the present exemplary embodiment will be described below referring to FIG. 9. The configuration of the imaging apparatus (preset traveling camera) according to the present exemplary embodiment is similar to the configuration of the imaging apparatus according to the first exemplary embodiment illustrated in FIG. 1.

First, a case in which the imaging apparatus is positioned in the area A and a mode set when the camera was positioned in the area A in the previous time is the day mode will be described. In step S1301, the imaging apparatus confirms the area A as the current area. Next, in step S1302, the imaging apparatus sets the day mode which is the same mode as the previous time in the area A.

In step S1303, the imaging apparatus confirms a mode currently set. Since the current mode is the day mode, the processing proceeds to step S1304. In step S1304, the brightness determination unit 109 determines whether the image data is darker than a predetermined value (TH).

If the image data is darker than the predetermined value (YES in step S1304), then in step S1305, the WB adjustment unit 108 turns the DN on. On the other hand, if the image data is not darker than the predetermined value (NO in step S1304), the mode is not changed. Next, in step S1306, the imaging apparatus stores the current area A and the current mode (the day mode or the DN).

Next, a case in which the imaging apparatus is positioned in the area A and the mode set when the camera was positioned in the area A in the previous time is the DN will be described. In step S1301, the imaging apparatus confirms the area A as the current area. Next, in step S1302, the imaging apparatus sets the DN which is the same mode as the previous time in the area A.

In step S1303, the imaging apparatus confirms the mode currently set. Since the current mode is the DN, the processing proceeds to step S1307. In step S1307, the brightness determination unit 109 determines whether the image data is darker than the predetermined value (TH).

If the image data is darker than the predetermined value (YES in step S1307), in step S1308, the WB adjustment unit 108 turns the DN off, and the filter control unit 110 turns the AN on. On the other hand, if the image data is not darker than the predetermined value (NO in step S1307), the mode is not changed. Next, in step S1306, the imaging apparatus stores the current area A and the current mode (the DN or the AN).

Next, a case in which the imaging apparatus is positioned in the area A and the mode set when the camera was positioned in the area A in the previous time is the AN will be described. In step S1301, the imaging apparatus confirms the area A as the current area. Next, in step S1302, the imaging apparatus sets the AN which is the same mode as the previous time in the area A.

In step S1303, the imaging apparatus confirms the mode currently set . Since the current mode is the AN, the processing proceeds to step S1309. In step S1309, the brightness determination unit 109 determines whether the image data is darker than the predetermined value (TH).

If the image data is darker than the predetermined value (YES in step S1309), then in step S1310, the WB adjustment unit 108 turns the DN on. Thus, the mode shifts to the mode of the DN+AN. On the other hand, if the image data is not darker than the predetermined value (NO in step S1309), the mode is not changed. Next, in step S1306, the imaging apparatus stores the current area A and the current mode (the AN or the DN+AN).

In the above description, only a case in which the imaging apparatus is positioned in the area A where brightness is changed with time is described. In a case in which the imaging apparatus is positioned in the area B with constant brightness regardless of the passage of time, in determination in steps S1304, S1307, and S1309 illustrated in FIG. 9, it is determined that the image data is not darker than the predetermined value (TH). Thus, the mode is not changed and the mode when the camera was positioned in the area B in the previous time is always set.

In a case where the mode is changed from the night mode to the day mode as illustrated in FIG. 8B such that the circumference becomes bright, the processing described in FIG. 9 is similarly executed, so that shooting can be executed in brightness suitable for each shooting scene. In FIG. 8B, an arrow 1401 indicates that the area A becomes bright with time and an arrow 1402 indicates that the area B is maintained at the constant brightness regardless of the passage of time.

As described above, in the present exemplary embodiment, when shooing the area A and the area B which are different in brightness as illustrated in FIG. 7, the shooting position and the mode corresponding thereto are stored. Accordingly, the mode for improving the sensitivity suitable for an environment of a shooting target can be reflected with good responsiveness.

Figure 10A:
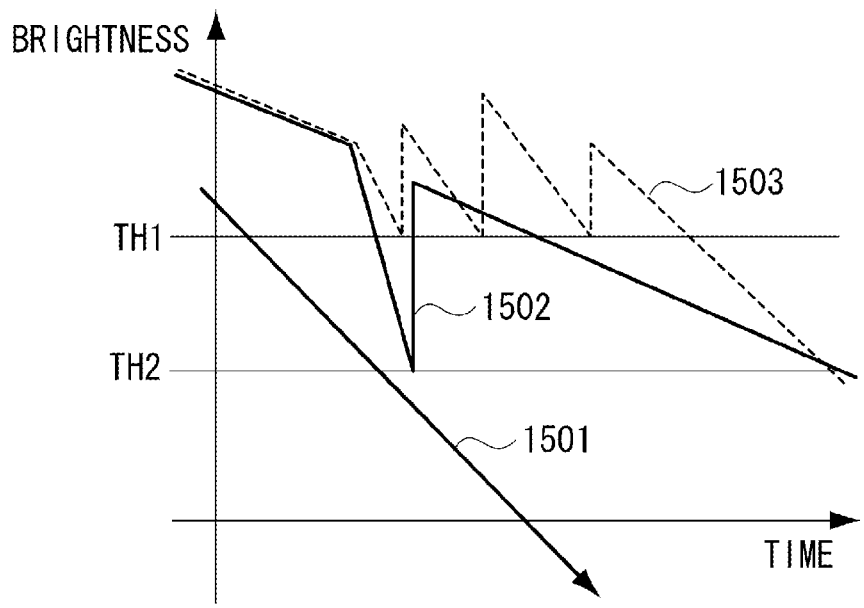
FIGS. 10A and 10B illustrate processing executed when a day mode is changed to a night mode according to a fourth exemplary embodiment of the present invention.
Figure 10B:
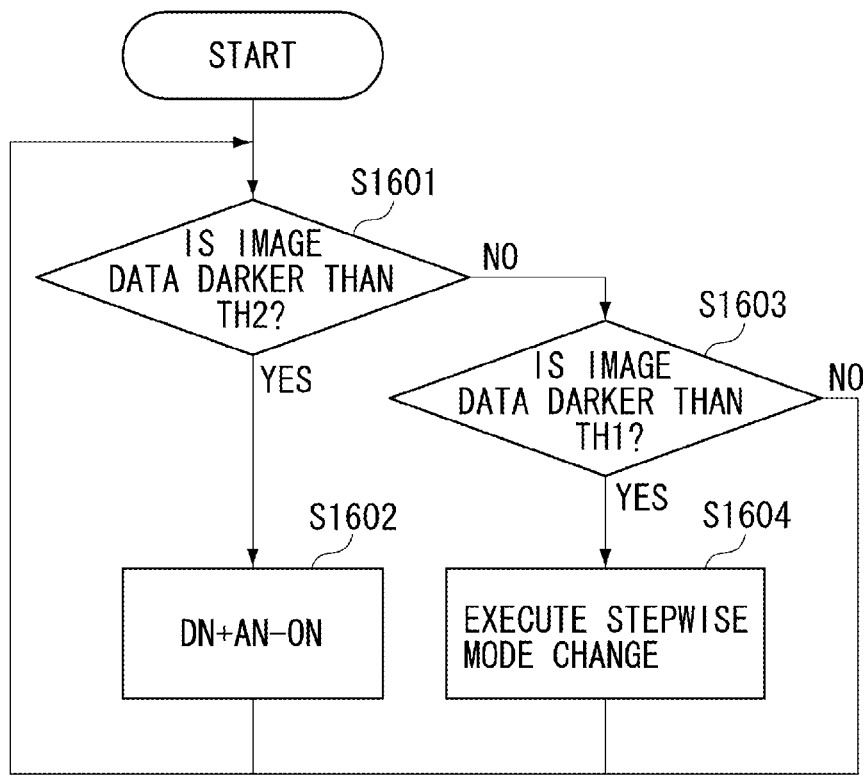

Next, a fourth exemplary embodiment of the present invention will be described. FIGS. 10A and 10B illustrate processing executed when the day mode is changed to the night mode according to the present exemplary embodiment. In FIG. 10A, as an example of processing when luminance is abruptly changed, processing in which the mode is changed from the day mode to the DN+AN is illustrated.

It is assumed that when a difference between brightness and darkness abruptly occurs, a stepwise mode change cannot swiftly respond thereto. Thus, in the present exemplary embodiment, when a substantial change in luminance of a predetermined amount or more occurs, the imaging apparatus changes the mode to the DN+AN from the beginning, instead of improving the sensitivity in a stepwise manner, thus the sensitivity can be improved with good responsiveness.

For example, as illustrated in FIG. 10A, a plurality of threshold values TH1 and TH2 that are used to shift the night mode is determined in advance. These threshold values are used to determine whether a luminance change can be sufficiently handled by a normal stepwise shift to the night mode or a luminance change can be handled by the change to the DN+AN mode from the beginning. In FIG. 10A, the threshold value TH1 is a threshold value for executing the normal stepwise processing and the threshold value TH2 is a threshold value for executing the change to the DN+AN.

Then, when the luminance change matches any of the threshold values, the imaging apparatus shifts to the corresponding mode for improving the sensitivity. In an environment where the image data is darkened over time as illustrated by an arrow 1501 in FIG. 10A, when the image data abruptly reaches darkness expressed by the threshold value TH2 as illustrated by a solid line 1502 in FIG. 10A, the imaging apparatus shifts the mode to the DN+AN mode at a stretch to swiftly improve the sensitivity.

On the other hand, as illustrated by a dotted line 1503 in FIG. 10A, when the change is not abrupt and darkness is gently changed to the threshold value TH1, the imaging apparatus changes the mode in a stepwise manner to improve the sensitivity. The above-described threshold TH1 is a configuration as an application example of a second value of the present invention. The above-described threshold TH2 is a configuration as an application example of a first value of the present invention.

FIG. 10B is a flowchart illustrating the processing executed when the day mode is changed to the night mode in the present exemplary embodiment. The processing executed when the day mode is changed to the night mode in the present exemplary embodiment will be described below referring to FIG. 10B. The configuration of the imaging apparatus according to the present exemplary embodiment is similar to the configuration of the imaging apparatus according to the first exemplary embodiment illustrated in FIG. 1.

First, in step S1601, the brightness determination unit 109 determines whether the image data is darker than the threshold value TH2.

If the image data is darker than the threshold value TH2 (YES in step S1601), in step S1602, the imaging apparatus determines that a normal stepwise mode change cannot respond swiftly, and changes the mode to the DN+AN at a stretch by the WB adjustment unit 108 and the filter adjustment unit 110. On the other hand, if the image data is not darker than the threshold value TH2 (NO in step S1601), in step S1603, the brightness determination unit 109 determines whether the image data is darker than the threshold value TH1.

If the image data is darker than the threshold value TH1 (YES in step S1603), in other words, if the brightness of the image data is the threshold value TH2 or more and has changed to the extent darker than the threshold value TH1, in step S1604, the imaging apparatus improves the sensitivity with the normal stepwise mode change. On the other hand, if the image data is not dark to the extent of the threshold value TH1 (NO in step S1603), the imaging apparatus maintains the current state without changing the mode. The processing to change the night mode to the day mode is similar to the processing described in the first exemplary embodiment. Thus, the description will be omitted.

As described above, according to the present exemplary embodiment, if an abrupt change of brightness as illustrated in FIG. 10A occurs, the imaging apparatus can responsively reflect a mode suitable for an environment of a shooting target.

Figure 11A:
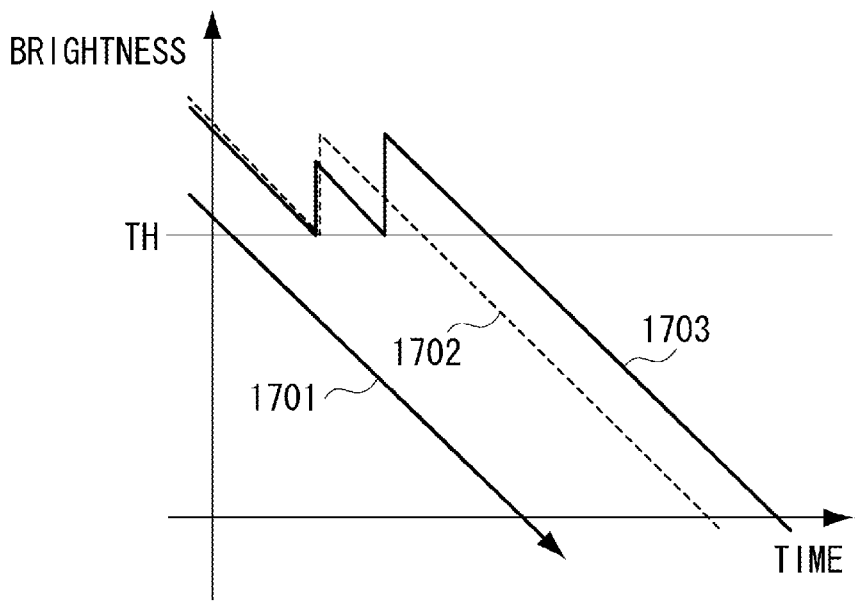
FIGS. 11A and 11B illustrate processing executed when a day mode is changed to a night mode according to a fifth exemplary embodiment of the present invention.
Figure 11B:
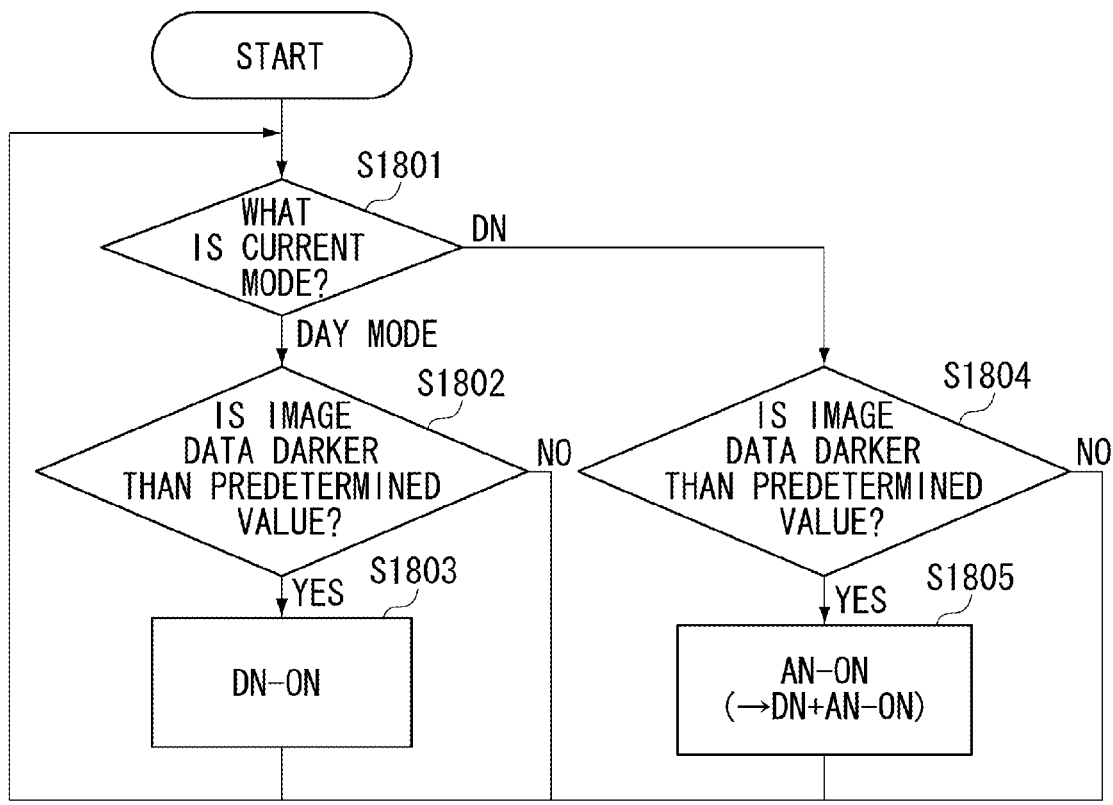

Next, a fifth exemplary embodiment of the present invention will be described. FIGS. 11A and 11B illustrate processing executed when the day mode is changed to the night mode according to the present exemplary embodiment. In an environment where the image data is darkened over time as illustrated by an arrow 1701 in FIG. 11A, the imaging apparatus of the conventional technique improves the sensitivity by extracting the IRCF 102-1 from the optical path when the image data becomes predetermined darkness (TH) as illustrated by a dotted line 1702 in FIG. 11A.

On the contrary, in the present exemplary embodiment, the imaging apparatus first shifts to the DN to improve the sensitivity when brightness of the image data becomes the predetermined darkness (TH) and executes both of the DN and the AN (DN+AN) when the brightness of the image data becomes further darker. Further, contrarily, when the image data becomes bright, the mode is returned from the state of the DN+AN to the day mode.

The above-described processing can reduce frequencies of in and out of the holding frame of the IRCF 102-1 in improving the sensitivity and also responsively improve the sensitivity. The sensitivity can be improved using both of the DN+AN. Thus, as compared with the conventional technique for improving the sensitivity only with the AN, for example, the present exemplary embodiment can realize an imaging apparatus having high performance in low-illuminance.

FIG. 11B is a flowchart illustrating the processing executed when the day mode is changed to the night mode in the present exemplary embodiment. The processing executed when the day mode is changed to the night mode in the present exemplary embodiment will be described below referring to FIG. 11B. The configuration of the imaging apparatus according to the present exemplary embodiment is similar to the configuration of the imaging apparatus according to the first exemplary embodiment illustrated in FIG. 1.

First, in step S1801, the imaging apparatus determines a current mode. In the environment where the image data is darkened over time as illustrated by the arrow 1701 in FIG. 11A, if the current mode is the day mode (DAY MODE in step S1801), then in step S1802, the brightness determination unit 109 determines whether the image data is darker than the predetermined value (TH). If the image data is darker than the predetermined value (YES in step S1802), in step S1803, the WB control unit 108 turns the DN on to improve the sensitivity.

In step S1801, the imaging apparatus determines the current mode after turning on the DN. Since the current mode is the DN, the processing proceeds to step S1804. In step S1804, the brightness determination unit 109 determines whether the image data is darker than the predetermined value (TH).

If the image data is darker than the predetermined value (YES in step S1804), in step S1805, the filter control unit 110 turns the AN on. As a result, the mode shifts to the DN+AN. In steps S1802 and S1804, if it is determined that the image data is not darker than the predetermined value, the mode is not changed and the processing returns to the mode determination processing in step S1801. The processing to change the night mode to the day mode is similar to the processing described in the first exemplary embodiment. Thus, the description will be omitted.

Figure 12A:
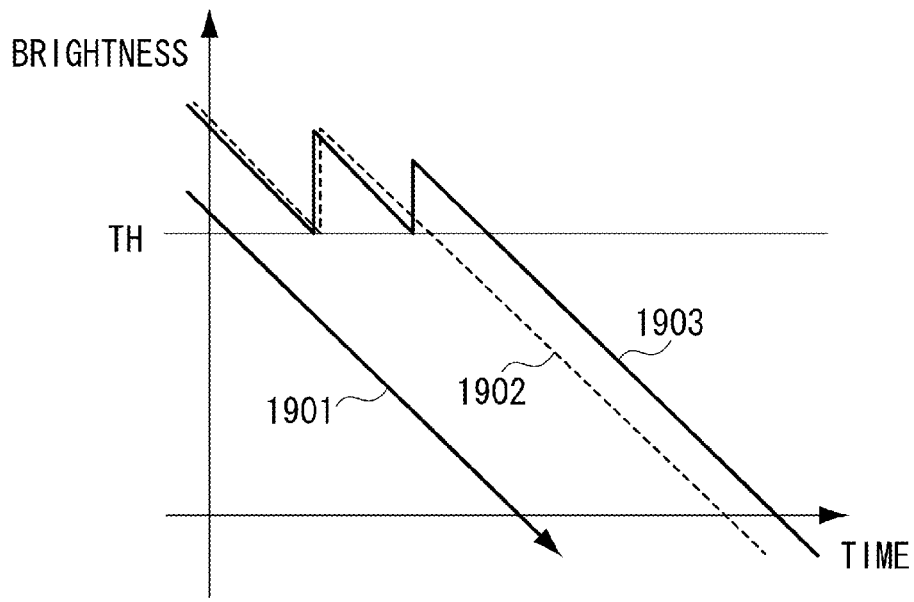
FIGS. 12A and 12B illustrate processing executed when a day mode is changed to a night mode according to a sixth exemplary embodiment of the present invention.
Figure 12B:
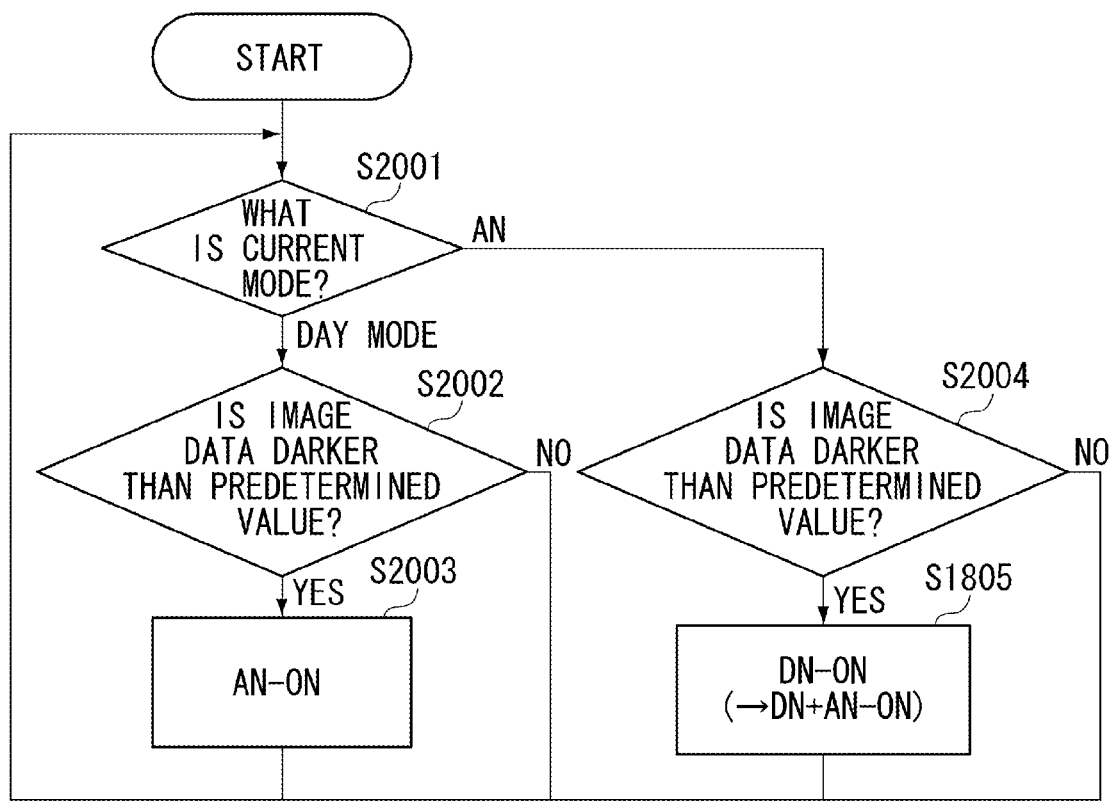

Next, a sixth exemplary embodiment of the present invention will be described. FIGS. 12A and 12B illustrate processing executed when the day mode is changed to the night mode according to the present exemplary embodiment. In an environment where the image data is darkened over time as illustrated by an arrow 1901 in FIG. 12A, the imaging apparatus of the conventional technique improves the sensitivity by extracting the IRCF 102-1 from the optical path when the image data becomes predetermined darkness (TH) as illustrated by a dotted line 1902 in FIG. 12A.

On the contrary, in the present exemplary embodiment, the imaging apparatus first shifts to the AN to improve the sensitivity when brightness of the image data becomes the predetermined darkness (TH) and executes both of the DN and the AN (DN+AN) when the brightness of the image data becomes further darker. Further, contrarily, when the image data becomes bright, the mode is returned from the state of the DN+AN to the day mode.

The above-described processing can suppress deterioration of a signal-to-noise (S/N) ratio as possible in improving the sensitivity to achieve improvement of the sensitivity. Further, the sensitivity can be improved using both of the DN+AN. Thus, as compared with the conventional technique for improving the sensitivity only with the AN, for example, the present exemplary embodiment can realize an imaging apparatus having high performance in low-illuminance.

FIG. 12B is a flowchart illustrating the processing executed when the day mode is changed to the night mode in the present exemplary embodiment. The processing executed when the day mode is changed to the night mode in the present exemplary embodiment will be described below referring to FIG. 12B. The configuration of the imaging apparatus according to the present exemplary embodiment is similar to the configuration of the imaging apparatus according to the first exemplary embodiment illustrated in FIG. 1.

First, in step S2001, the imaging apparatus determines a current mode. In the environment where the image data is darkened over time as illustrated by the arrow 1901 in FIG. 12A, if the current mode is the day mode (DAY MODE in step S1901), then in step S1902, the brightness determination unit 109 determines whether the image data is darker than the predetermined value (TH). If the image data is darker than the predetermined value (YES in step S2002), in step S2003, the filter control unit 110 turns the AN on to improve the sensitivity.

In step S2001, the imaging apparatus determines the current mode after turning on the AN. In step S2004, the brightness determination unit 109 determines whether the image data is darker than the predetermined value (TH). If the image data is darker than the predetermined value (YES in step S2004), in step S2005, the WB adjustment unit 108 turns the DN on. As a result, the mode shifts to the DN+AN. In steps S2002 and S2004, if it is determined that the image data is not darker than the predetermined value, the mode is not changed and the processing returns to the mode determination processing in step S2001. The processing to change the night mode to the day mode is similar to the processing described in the first exemplary embodiment. Thus, the description will be omitted.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-160613 filed Jul. 15, 2010, which is hereby incorporated by reference herein in its entirety.

What is claimed is:

1. An imaging apparatus comprising:
  an imaging unit;
  a memory;
  a processor coupled to the memory which executes the following:
    adjusting a white balance of image data output from the imaging unit;
    determining brightness of the image data;
    determining a current position of the imaging apparatus;
    controlling a filter in order not to cause light including a predetermined wavelength component to be incident on the imaging unit;
    if the brightness of the image data is darker than a predetermined value, execute both of a first mode for increasing a gain of each color of the image data so that a sensitivity becomes higher and a second mode for controlling the filter so as to cause the light including the predetermined wavelength component to be incident on the imaging unit; and setting an operating of the imaging apparatus to at least one of the first mode and the second mode according to a mode previously controlled in the position determined.

2. The imaging apparatus according to claim 1, wherein the first mode and the second mode are executed in a stepwise manner every time it is determined that the brightness of the image data is darker than the predetermined value.

3. The imaging apparatus according to claim 1, wherein the first mode and the second mode are executed in a case that the brightness of the image data is darker than a first value, and the first mode and the second mode are executed in a stepwise manner in a case that the brightness of the image data is brighter than the first value and is darker than a second value which is a value brighter than the first value.

4. The imaging apparatus according to claim 1, wherein if both of the first mode and the second mode are executed and the brightness of the image data becomes brighter than the predetermined value, the first mode and the second mode are both turned off.

5. A method for controlling an imaging apparatus including an imaging unit, the method comprising:

adjusting a white balance of image data output from the imaging unit by a white balance adjustment unit;

determining brightness of the image data;

determining a current position of the imaging apparatus;

controlling a filter in order not to cause light including a predetermined wavelength component to be incident on the imaging unit;

executing, if it is determined that the brightness of the image data is darker than a predetermined value, both of a first mode for increasing a gain of each color of the image data by the white balance adjustment unit, the first mode not performing a white balance adjustment by the white balance adjustment unit, and a second mode for controlling the filter so as to cause the light including the predetermined wavelength component to be incident on the imaging unit by the filter control; and setting an operating of the imaging apparatus to at least one of the first mode and the second mode according to a mode previously controlled in the position determined.

6. A non-transitory computer readable storage medium storing a program to cause a computer to execute a method for controlling an imaging apparatus including an imaging unit, the method comprising:

adjusting a white balance of image data output from the imaging unit by a white balance adjustment unit;

determining brightness of the image data;

determining a current position of the imaging apparatus;

controlling a filter in order not to cause light including a predetermined wavelength component to be incident on the imaging unit;

executing, if it is determined that the brightness of the image data is darker than a predetermined value, both of a first mode for increasing a gain of each color of the image data by the white balance adjustment unit, the first mode not performing a white balance adjustment by the white balance adjustment unit, and a second mode for controlling the filter so as to cause the light including the predetermined wavelength component to be incident on the imaging unit by the filter control; and setting an operating of the imaging apparatus to at least one of the first mode and the second mode according to a mode previously controlled in the position determined.

* * * * *